United States Patent [19]

Fantone

[11] 4,432,832

[45] Feb. 21, 1984

[54] METHOD OF FORMING CONTOURED OPTICAL LAYERS ON GLASS ELEMENTS

[75] Inventor: Stephen D. Fantone, Saugus, Mass.

[73] Assignee: Polaroid Corporation, Cambridge, Mass.

[21] Appl. No.: 411,685

[22] Filed: Aug. 26, 1982

[51] Int. Cl.³ .................. B29C 19/00; B44C 1/22; B32B 31/00; C03C 15/00
[52] U.S. Cl. .................. 156/630; 156/634; 156/656; 156/664; 156/245; 156/247; 156/273.7; 156/275.5; 156/289; 156/344; 264/1.7; 428/336; 428/417
[58] Field of Search ............... 156/630, 631, 634, 656, 156/664, 643, 242, 245, 247, 289, 344, 272.2, 273.7, 275.5; 264/1.1, 1.7, 22, 25, 259, 267, 279; 428/336, 417

[56] References Cited

U.S. PATENT DOCUMENTS 2,404,314  7/1946  Rogers .
2,406,361  8/1946  Fairbank et al. .
3,971,841  7/1976  Rubinstein .................. 264/275

*Primary Examiner*—William A. Powell
*Attorney, Agent, or Firm*—Francis J. Caufield

[57] ABSTRACT

A method for forming an optical layer having an aspheric surface on a given surface area of a glass optical element to change the optical performance characteristics of the glass element. A cavity having a shape complementary to that of the aspheric surface is first formed in a tool and afterwards plated with at least one metal release layer preferably of silver. The cavity is then filled with a UV curable epoxy and then brought into registration with the optical element. The epoxy is then hardened by exposure of the epoxy to ultraviolet radiation. Tool and element are then separated and the metal release layer, which adheres to the epoxy, is then chemically removed.

6 Claims, 5 Drawing Figures

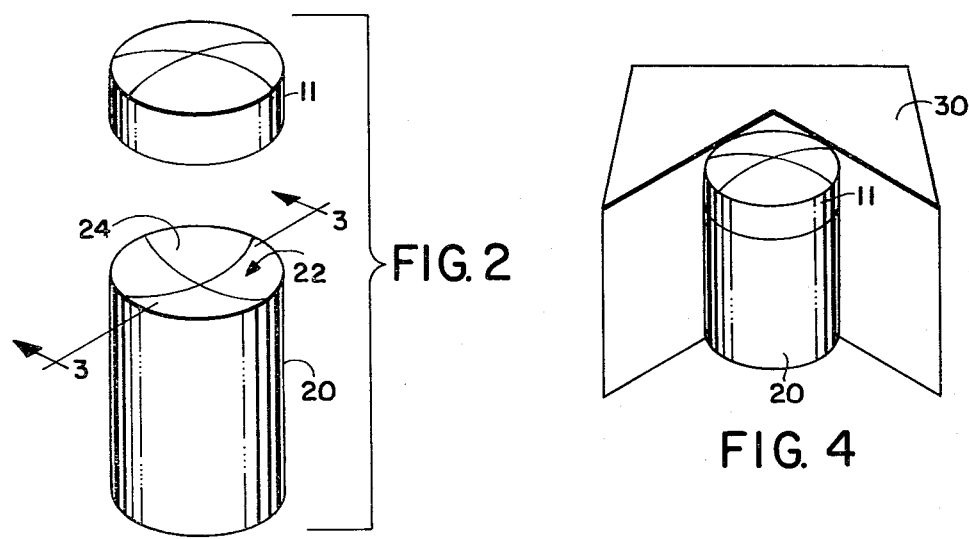
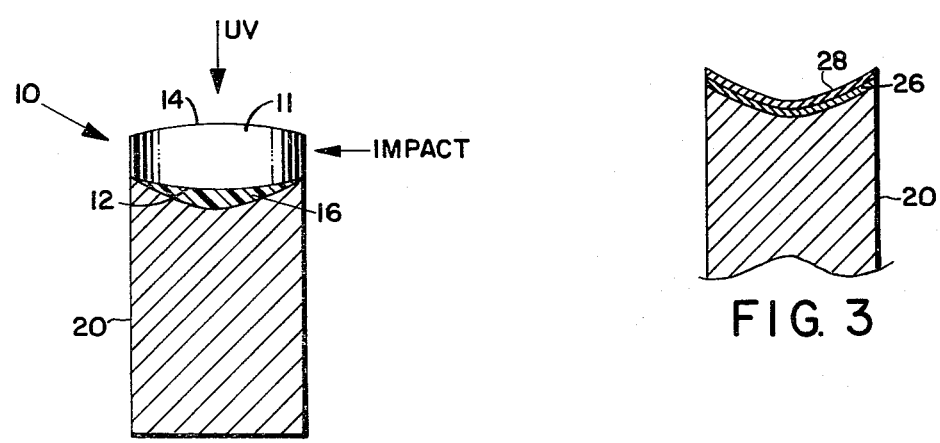
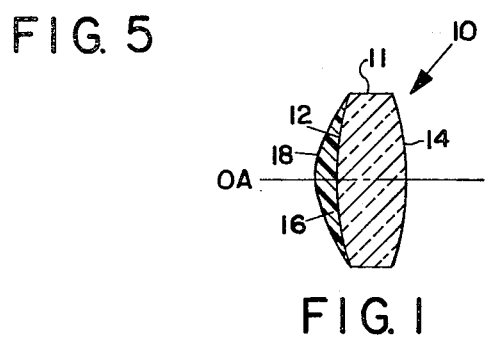

METHOD OF FORMING CONTOURED OPTICAL LAYERS ON GLASS ELEMENTS

BACKGROUND OF INVENTION

This invention in general relates to optical fabrication techniques and in particular to a method by which an optical layer with a predetermined surface contour can be accurately formed on a glass optical element to change the optical performance characteristics of the glass element in a desired way.

As is well known, the design of optical systems is to a great extent influenced by the methods available for accurately and economically fabricating their components or elements. Consequently, designers favor spherical surfaces whenever possible because they can be economically generated with great accuracy by the well-known method of random grinding and polishing.

Conversely, nonspherical or aspheric surfaces are generally avoided, except when no other solution is possible, because the simple principle of random grinding and polishing which generates a sphere must necessarily be replaced by more elaborate and expensive means. However, aspherics can be made in modest production quantities if high precision is not required. A cam guided diamond grinding wheel usually is employed to generate the surface as precisely as possible. Then the surface is fine ground and polished with flexible tools taking care not to destroy the basic shape. If high precision is requied, hand correction is practically a necessity.

Aspherics can also be molded of suitable optical plastics and are very practical made in this manner but can only be used whenever the quantities required are sufficient enough to justify the cost of the required molds.

Consequently, there is a need for a method by which aspheric surfaces can be accurately and economically fabricated, particularly in situations where the volume requirements are low as, for example, in the fabrication of large optics or prototype systems.

Therefore, it is a primary object of the present invention to provide a convenient method by which aspheric surfaces can be generated.

It is another object of the present invention to provide a method by which an optical layer with an aspheric surface can be formed over a glass element to change the optical performance characteristics of the glass element.

It is still another object of the present invention to provide a method by which an optical layer can be formed over a glass element to simulate the optical action of an aspheric element fabricated of material different from either the glass or the layer.

Other objects of the invention will, in part, be obvious and will, in part, appear hereinafter. The invention accordingly comprises the steps of a method and apparatus which are exemplified in the following detailed description and products made with the method.

SUMMARY OF THE INVENTION

This invention, in general, relates to optical fabrication techniques and, in particular, to a method by which an optical layer having a predetermined surface contour can be formed on a given surface area of a glass optical element to change the optical performance characteristics of the glass element in a desired way.

The method of the invention comprises the steps of forming a tool having a cavity with a depth that varies in accordance with the desired point to point difference in thickness between the optical element given surface area and the optical layer predetermined surface contour plus a predetermined uniform thickness value such that the bottom of the cavity has a shape which is the complement to that of the optical layer predetermined surface contour.

The bottom surface of the cavity is then plated with at least one metal release layer, preferably silver, to a uniform thickness value.

The cavity is then filled with a clear epoxy that is curable in the presence of ultraviolet radiation and has a predetermined index of refraction.

Afterwards, the open end of the cavity is aligned over the optical element given surface area and the tool is firmly pressed against the optical element, centering both, to form the layer surface contour taking care that no bubbles are present in the epoxy.

The epoxy is then subjected to ultraviolet radiation until cured to a hardened state after which the tool and optical element are separated.

Separation of the tool and optical element is accomplished by a sharp impact which causes the optical element to release from the tool cavity carrying the release layer with it which then is chemically removed from the optical layer surface.

DESCRIPTION OF THE DRAWINGS

The novel steps that are considered characteristic of the invention are set forth with particularity in the appended claims. The invention itself, however, together with other objects and advantages thereof will be best understood from the following description of the illustrated method when read in connection with the accompanying drawings wherein like numbers have been employed in the different figures to denote the same parts and wherein:

FIG. 1 is a diagrammatic cross-sectional view of an optical component fabricated according to the method of the invention;

FIG. 2 is a diagrammatic perspective view of an optical element and a tool for forming an optical layer on the optical element;

FIG. 3 is a diagrammatic cross-sectional view of part of the tool of FIG. 2 taken generally along line 3—3 and greatly exaggerated to illustrate certain layers formed on the tool cavity.

FIG. 4 is a diagrammatic perspective view showing the optical element and tool of FIG. 1 centered in an alignment fixture; and FIG. 5 is a cross-sectional view of the optical element and tool of FIG. 2 shown in combination with an optical layer between the optical element and the tool.

DETAILED DESCRIPTION

This invention relates to a method for forming an optical layer having a pedetermined surface contour on a given surface of a glass optical element to change the optical performance characteristics of the glass element in a useful way and is particularly suitable for use in low volume applications for forming rotationally symmetric aspheric refracting layers on glass elements, whether curved or flat, although not restricted in scope to just aspherics or even rotationally symmetric shapes as will be seen hereinafter.

To best understand the method of the invention, reference is now made to FIG. 1 which shows an optical component 10 fabricated according to the method of the invention. The component 10 comprises a glass biconvex element 11 having front and rear spherical surfaces, 12 and 14 respectively, ground and polished in the usual way. To the front surface 12 is adhered an optical layer 16 (shown exaggerated) having an aspheric surface 18. The optical layer 16 comprises an optically clear epoxy having a predetermined shape selected to modify the optical performance characteristics of the glass element 11 to, for example, minimize certain aberrations.

The optical layer 16 is formed on the front surface 12 in the following way. First, a stainless steel tool, as shown at 20 in FIG. 2 and having the same diameter as that of the optical element 11, is turned in a conventional manner to provide it with a concave cavity 22 having a bottom surface 24 whose shape is the complement to that of the aspheric surface 18. The cavity bottom surface 24 is then plated by evaporation with a release layer 26 as shown in FIG. 3. The release layer 26 is preferably silver having a thickness within the range of 100 to 500 angstroms. However, other metals such as gold or copper may also be used.

A protective layer 28 is then evaporated over the release layer 26 to a thickness within the range of $\frac{1}{4}$ to $\frac{1}{2}$ wavelength and preferably comprises silicon dioxide. Because of the presence of the layers 26 and 28, the depth of the cavity 22 must necessarily be the point to point difference in thickness between the optical element spherical surface 12 and the aspheric surface 18 plus the thickness of the layers, 26 and 28.

The cavity 22 is then filled with an optically clear epoxy that is curable upon exposure to ultraviolet radiation. Epoxies which have been found successful are those, for example, sold by Norland Products, Inc. of New Brunswick, NJ as one part photopolymers as, for example, their product NOA61, and by Summer Laboratories, Inc., Optical Division, Fort Washington, PA under their trade name Lens Bond Optical Cement with product identification numbers UV-69, 71, and 74.

The tool 20 is then placed in a V-block 30 as shown in FIG. 4. Afterwards, the optical element 11 is lowered into registration with the open end of the cavity 22 and centered with respect to the tool 20 using the V-block 30 as an alignment means. Upon registration, the optical element 11 is firmly pressed against the peripheral edges of the cavity 22 taking care to assure that no bubbles are present in the epoxy and that the lens element 11 and the cavity 22 are not tilted with respect to one another.

Once proper alignment is achieved, ultraviolet radiation is directed through the lens element rear surface 14 as shown in FIG. 5 for a period of 15 to 20 seconds after which the epoxy is in a precured state. Full cure to a hardened state is achieved by exposing the epoxy to ultraviolet radiation for a period of 30 to 90 minutes.

The tool 20 and lesn component 10 are then separated from one another by, for example, sharply impacting the lens component 10 as illustrated diagrammatically in FIG. 5. Upon separation, the release layer 26 and the protective layer 28 remain with the lens component 10. The release layer 26 is then chemically removed from the protective layer preferably with potassium ferricyanide.

Following this method, aspheric surfaces have been fabricated to within millionths of their desired shape at rates of between 6 to 8 replications per day.

If there is a large index mismatch between the epoxy used and the glass comprising the lens element to be modified, an anti-reflection coating can be applied to the interfacing surface between the optical element 11 and the epoxy layer 16.

The simplest coating here is a $\frac{1}{4}$ wave optical thickness layer of a material whose index of refraction, $n_L$, is equal to $\sqrt{n_g n_e}$ where $n_g$ is equal to the glass index and $n_e$ is equal to the epoxy index of refraction.

It will be obvious to those skilled in the art that changes may be made in the above-described method without departing from the scope of the invention. For example, it has been found that the protective silicon dioxide coating is not essential or may be replaced with other suitable coatings. Also it will be obvious that concave shapes, whether rotationally symmetric or not, may also be replicated with this method. Therefore, it is intended that all matter contained in the above description or shown in the accompanying drawings shall be interpreted as illustrative and not in a limiting sense.

What is claimed is:

1. A method for forming an optical layer having a predetermined surface contour over a given surface area of a transmissive optical element to change the optical performance characteristics of the optical element, aid method comprising the steps of:
    forming a tool having a shape that varies in accordance with the point to point difference in thickness between the optical element given surface area and the optical layer predetermined surface contour plus a predetermined uniform thickness value such that said shape of said tool is the complement so that of said layer predetermined surface contour;
    coating at least said surface of said tool with at least one release layer having a thickness equal to said predetermined uniform thickness value;
    covering said tool surface with an optically clear epoxy that is curable in the presence of ultraviolet radiation and has a predetermined index of refraction;
    aligning said tool with the optical element given surface area and firmly pressing said tool and said optical element given surface area together to center one with the other;
    exposing said epoxy to ultraviolet radiation until said epoxy hardens over the optical element given surface area; and
    separating said tool and the optical element whereby said optical layer releases from said tool with said release layer adhered to it and then chemically removing any of said release layer from the surface of said optical layer.

2. The method of claim 1 wherein said release layer comprises one of the metals, gold, silver or copper.

3. The method of claim 2 wherein said metal is plated to a thickness within the range from 100 to 500 angstroms.

4. The method of claim 3 wherein said tool comprises stainless steel.

5. The method of claim 3 comprising the additional step of evaporating a protective layer of silicon dioxide over said metal release layer after which said uniform thickness value comprises the thickness of said metal release layer and said protective layer of silicon dioxide.

6. The method of claim 5 wherein the thickness of said protective layer is within the range from $\frac{1}{4}$ to $\frac{1}{2}$ wavelength.

* * * * *

Disclaimer 4,432,832.—*Stephen Fantone*, Saugus, Mass. METHOD OF FORMING CONTOURED OPTICAL LAYERS ON GLASS ELEMENTS. Patent dated Feb. 21, 1984. Disclaimer filed Aug. 31, 1984, by the assignee, *Polaroid Corp.*

Hereby enters this disclaimer to claims 1–6 of said patent.

[*Official Gazette October 30, 1984.*]